Oct. 27, 1970   L. J. GOLDBERG   3,536,898
DETECTION DEVICE
Filed Dec. 4, 1967   3 Sheets-Sheet 1
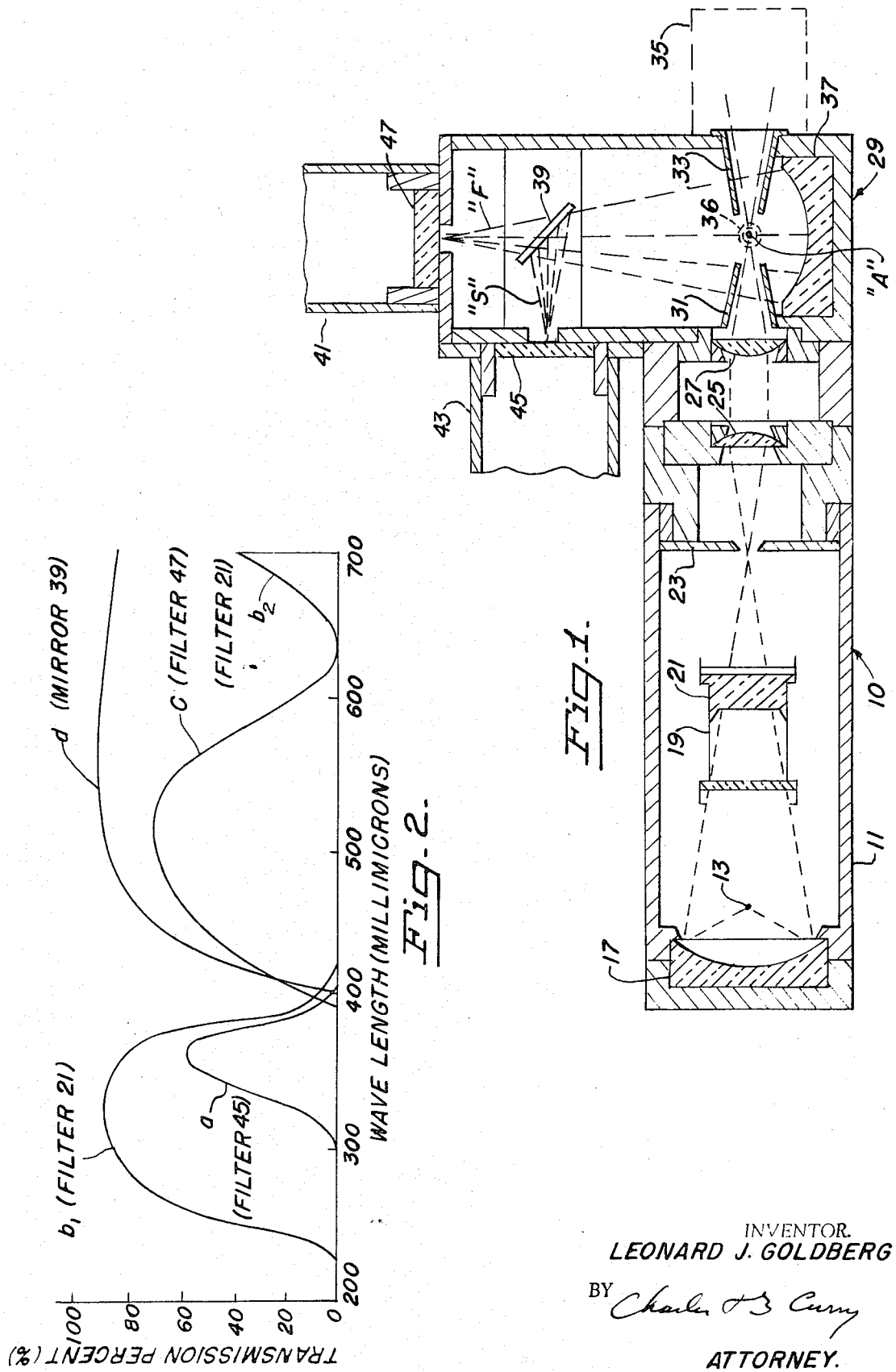
INVENTOR.
LEONARD J. GOLDBERG
BY
ATTORNEY.

Oct. 27, 1970
L. J. GOLDBERG
3,536,898
DETECTION DEVICE
Filed Dec. 4, 1967
3 Sheets-Sheet 2
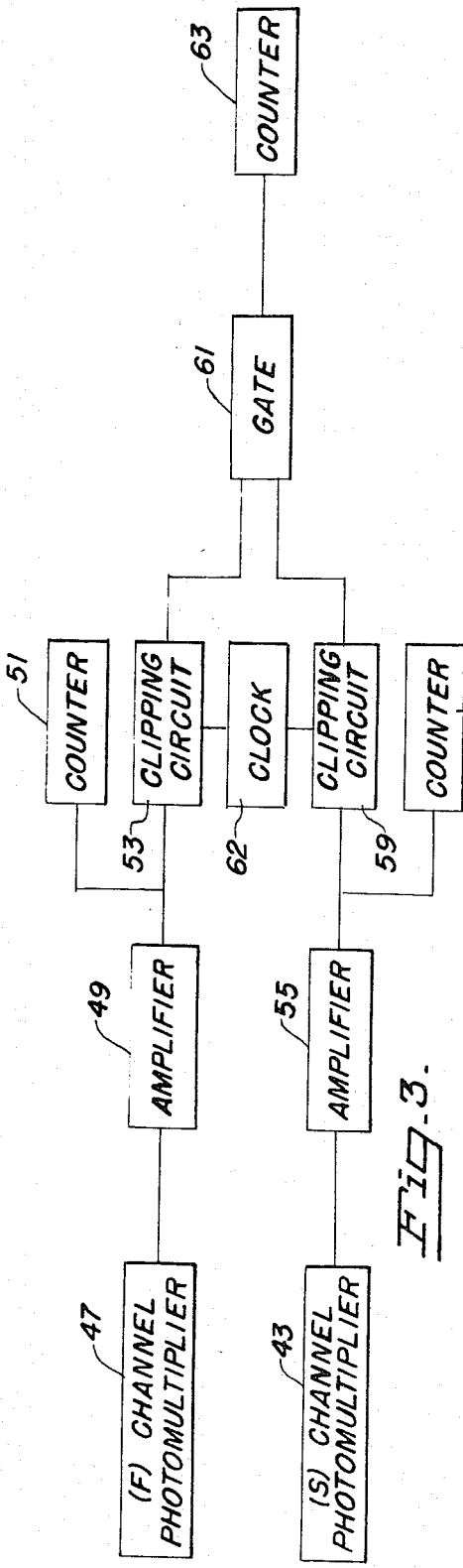
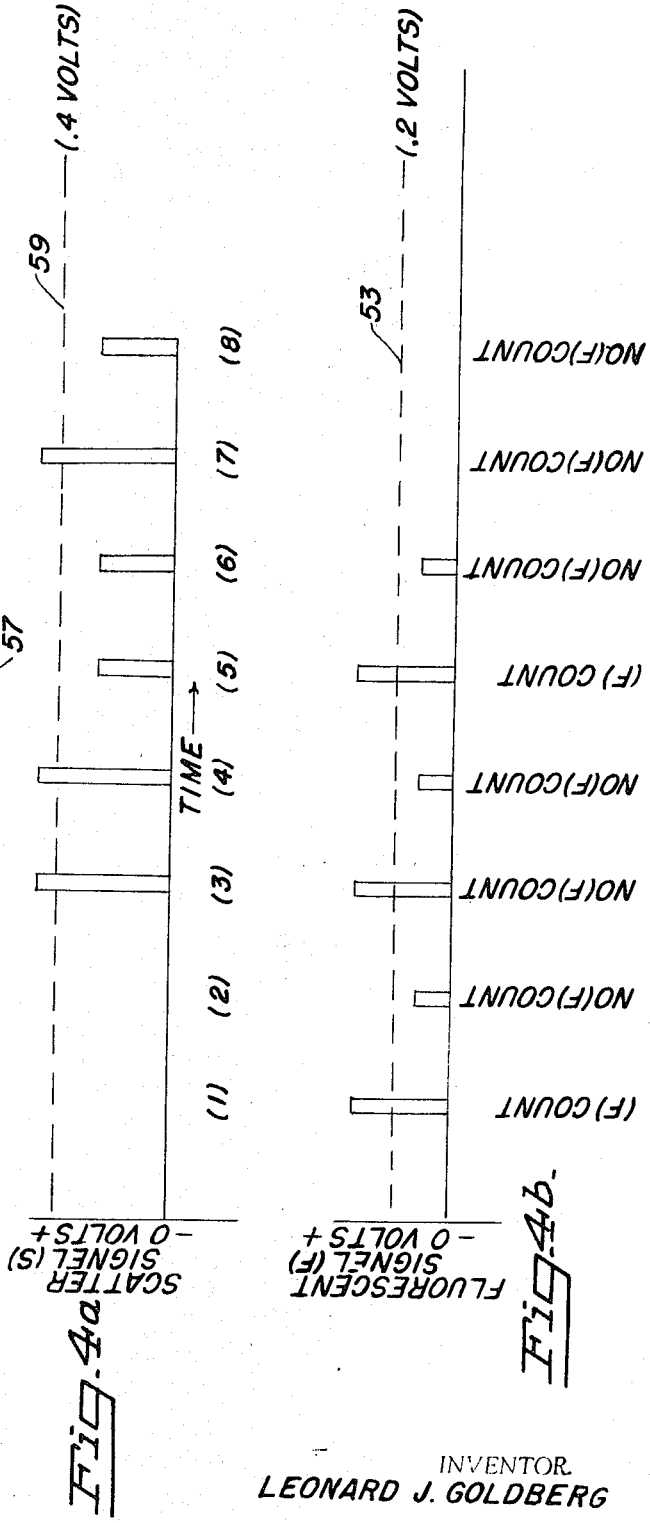
INVENTOR.
LEONARD J. GOLDBERG
BY
ATTORNEY Oct. 27, 1970 L. J. GOLDBERG 3,536,898
DETECTION DEVICE
Filed Dec. 4, 1967 3 Sheets-Sheet 3

INVENTOR.
LEONARD J. GOLDBERG
BY
ATTORNEY

3,536,898
DETECTION DEVICE
Leonard J. Goldberg, Pleasant Hill, Calif., assignor, by mesne assignments, to the United States of America as represented by the Secretary of the Navy
Filed Dec. 4, 1967, Ser. No. 687,806
Int. Cl. G01n 21/00
U.S. Cl. 235—92     6 Claims

ABSTRACT OF THE DISCLOSURE

A device for detecting fluorescent and non-fluorescent particles contained in air that is being sampled comprising a light source that has its beam focused on a continuous stream of sampled air. The light pulses emanating from the non-fluorescent particles (S) are processed and counted and the light pulses emanating from the fluorescent particles (F) are processed and counted. The light pulses emanating from large non-fluorescent particles are not counted even though these large particles give off light in the fluorescent region. One embodiment for achieving this uses a linear threshold circuit for detecting the large light output of the large non-fluorescent particles and uses this information to prevent counting the large non-fluorescent as fluorescent particle. Another embodiment achieving this objective uses a pair of logarithm amplifiers and a log difference circuit.

---

The invention described heren may be manufactured and used by or for the Government of the United States of America for governmental purposes without payment of any royalties thereon or therefor.

The present invention relates to a device for detecting atmospheric contaminants and more particularly to such a device that is extremely sensitive and capable of detecting very small quantities of contaminants.

In studies relating to hospital air sanitation, industrial air quality control, smog control in urban and rural, areas, and the like, there is the requirement of detailed knowledge of the movement of air masses. In these studies, the movement of air masses is generally detected through the introduction and subsequent detection of tracer materials in the air. One of the tracer materials frequently used is a fine particulate fluorescent pigment, zinc cadmium sulfide. One method for detecting and counting particles, as small as 0.5 to 1.0 microns in diameter, has been with visual fluorescence microscopy. However, such a visual microscopic counting technique is very laborious and requires considerable care when concentrations lower than 1.0 particles per 10 liters of air are being assayed. Therefore, identifying or sensing fluorescent tracers in air masses by use of this technique have been limited by the very tedious visual microscopic analysis required as well as by the delay between sampling and obtaining final results.

Another technique used for sensing fluorescent tracers in air masses has been the use of electro-optical sensor equipment that senses the light from fluorescent particles. However, a major difficulty has been encountered when using prior equipment of this type in areas where there is considerable agitation of the air masses, such as in actively inhabited or working areas. This difficulty arises because areas of this type usually have a considerable number of large non-fluorescent particles and these particles produce "false fluorescent" signals in this prior equipment. These "false fluorescent" signals reduce the selectivity of this equipment and impede the accurate detection of the fluorescent aerosolized tracer. Typically, a liter of air sampled under these conditions will yield $10^3$ or $10^4$ measurable particles which will include from 1 to 10 particles that are sufficiently large so as to yield "false fluorescent" signals. These "false fluorescent" signals become especially critical when sensing air masses having an actual fluorescent particle concentration of one to several fluorescent particles per liter of sampled air. Because of this "false fluorescent" signal background it is necessary to provide equipment capable of sensing only the fluorescent particle signals and rejecting the "false fluorescent" signals.

These difficulties have been overcome by the present invention which is an electro-optical sensor device capable of instantaneous read-out of non-fluorescent and aerosolized fluorescent particles. The present invention has an effective sampling rate of about twelve liters per minute and a senitivity as low as 1.0 particle per 10 liters for selected fluorescent particles of 0.5 micron or greater in diameter. In addition the present invention is capable of rejecting "false fluorescent" signals and sensing only the required fluorescent signals. It has been found that in a room with normal activity, fluorescent tracer concentrations of one particle per liter can be quantitatively assayed.

Accordingly, the object of the present invention is to provide an extremely accurate and sensitive device for tracing the movement of atmospheric contaminants.

Briefly, the present invention comprises a detection device used to detect atmospheric particulate contaminants by drawing air samples through a sampling head. Light from a light source is focused on the sampled air in the sampling head and is collected by a mirror system having a light trap. The light trap functions to trap substantially all of the light when the sampled air is free of contaminants. When the air includes contaminants, the mirror system collects that light scattered by the contaminants and focuses this scattered light on a dichroic mirror that reflects light having a wave length less than about 400 millimicrons and transmits light which has a wave length greater than about 400 millimicrons. The reflected light, referred to as the scattered light (S), is focused on a sensing device, such as a photomultiplier tube, the output of which is monitored by electronic equipment. The transmitted light, referred to as fluorescent light (F), is focused on another sensing device, such as a photomultiplier tube, the output of which is also monitored by electronic equipment. Between the dichroic mirror and the photomultiplier tube, receiving the scattered light is disposed a colored glass filter which transmits scattered light having a wavelength from about 300 to about 400 millimicrons. Between the dichroic mirror and the photomultiplier tube receiving the fluorescent light is disposed a filter that transmits light in the fluorescent region having wave lengths from about 400 to about 500 millimicrons. The light source is preferably a mercury arc lamp emitting light having a wave length predominantly in the range of 300 to 500 millimicrons. This light is transmitted through a corrective filter that rejects light having a wave length of from about 400 to 600 millimicrons. Therefore, the corrective filter transmits light that is transmitted by the scattered light filter but rejects light, in the fluorescent region, that is transmitted by the fluorescent light filter. It should be noted that the corrective filter transmits in the region beyond 650 millimicons which is excluded from the fluorescent photodetector by the fluorescent filter. As a result, non-fluorescent particles scatter only non-fluorescent light, except for large particles, which also scatter light in the fluoresecnt region. Fluorescent region. Fluorescent particles will give off fluorescent light which is excited by the lower wave length light that is transmitted through the corrective filter.

In one embodiment of the present invention the scattered light signal (S) and the fluorescent light signal (F) are each amplified and then respectively applied to the input of two separate clipping circuits. The clipping circuit to which the (S) signal is applied is set at a predetermined value which will provide an output pulse when the (S)

signal is below a predetermined value and will provide no output pulse when the (S) signal exceeds the predetermined value. The (S) signal will exceed this predetermined value when a large particle is being analyzed and which large particle also yields a "false fluorescent" signal. The (F) signal is applied to a clipping circuit which provides an output pulse when the (F) signal exceeds a predetermined value. However, (F) signals less than this predeterminted value provide no output to eliminate undesirable noise from triggering the circuit. The (F) signals above this predetermined value, above the noise threshold, will result in an output pulse. The outputs of the (S) signal clipping circuit and the (F) signal clipping circuits are respectively applied to the input of an "AND" gate. The large (S) signal, which also provides a "false fluorescent" signal that is above the predetermined value results in no output pulse from the (S) clipping circuit and therefore prevents the "AND" gate from providing an output pulse and therefore prevents counting the "false fluorescent" signal which is also applied to this gate input from the (F) clipping circuit. Therefore, the gate will provide no output signal when a "false fluorescent" signal is received but will provide an output count when a real fluorescent signal (F) is received.

In another embodiment of the present invention the (F) signal and the (S) signal are respectively amplified and then respectively transmitted to the inputs of two matched DC logarithmic amplifiers. The two signal outputs from the DC logarithmic amplifiers are respectively applied to the inputs of a differential DC amplifier to provide a log (F)—log (S) output. This processed signal is a measure of the fluorescent brilliance per unit area of a particle passing through the image of the focused arc, since log $(F) - \log (S) = \log (F/S)$.

Other objects, advantages and novel features of the invention will become apparent from the following detailed description of the invention when considered in conjuction with the accompanying drawings wherein:

FIG. 1 is a side view in section of the detector of the present invention;

FIG. 2 is a diagram illustrating the light characteristics of the detector of FIG. 1;

FIG. 3 is a schematic diagram of one embodiment of the detector circuitry of the present invention;

FIGS. 4A and 4B are diagrams illustrating (S) and (F) electrical pulses processed by the detector circuitry in FIG. 3.

Figure 5:
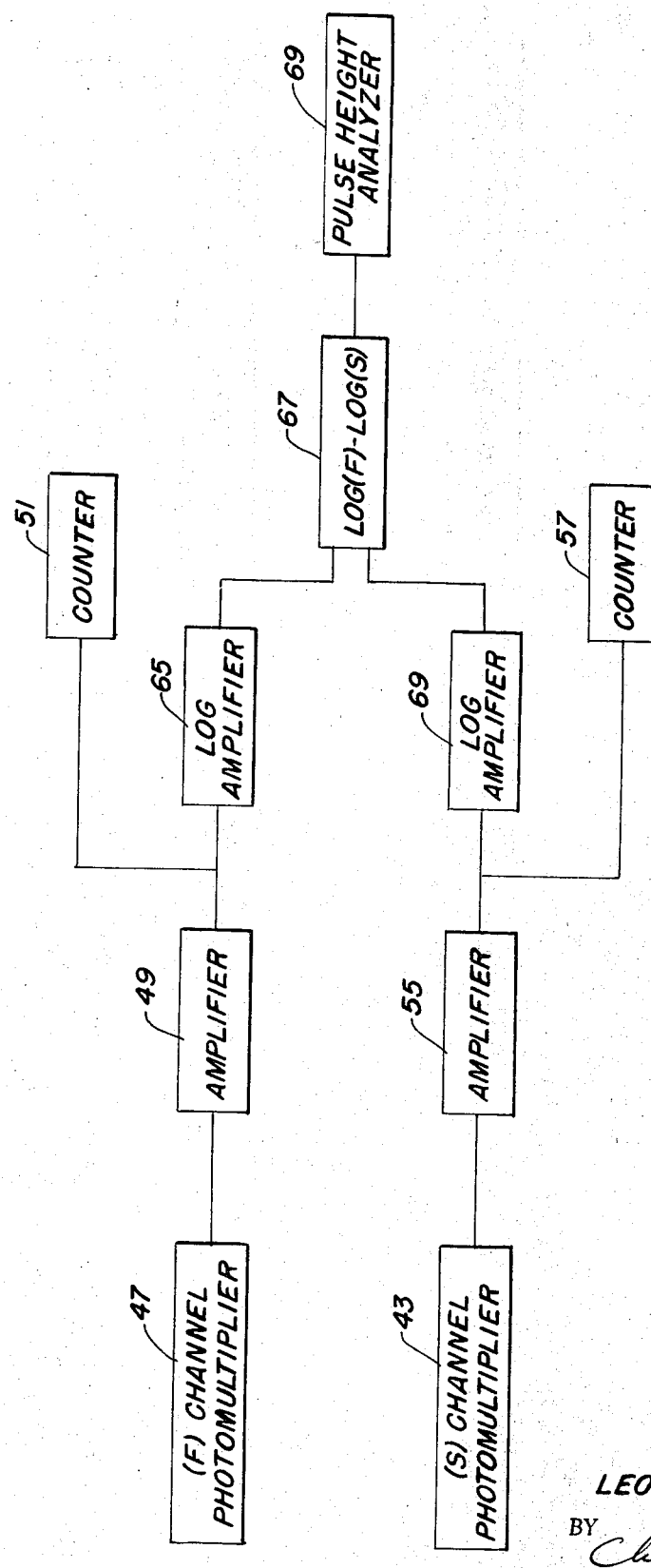
FIG. 5 is a schematic diagram of another embodiment of the detector circuitry of the present invention.

In FIG. 1 is a side view, in section, of the mechanical arrangement of detector 10 of the present invention. This detector comprises a frame 11 which is an enclosed structure as illustrated. A light source 13 is connected to one end of frame 11 at the position generally illustrated. The light emanating from light source 13 is collected by elliptical mirror 17 which forms a converging light beam that passes through liquid cooling cell 19 and corrective filter 21. From filter 21 the converging light beam focuses at the aperture of diaphragm 23 and then diverges into lens 25. Lens 25 converts the diverging light beam into a parallel beam which is received by focusing lens 27 which converts the parallel beam to a converging beam which is focused at point "A" of sampling head 29. Sampling head 29 includes aperture 31 and aperture 33 through which light passes from source 13. Aperture 31 is converging and has substantially the same configuration as the converging light beam from lens 27. Aperture 33 is diverging and has substantially the same configuration as the diverging light beam after it passes through focal point "A." Light trap 35, illustrated by dotted lines, collects all of the light emanating from light source 13, that is transmitted through aperture 31 when there is no light scattering at focal point "A" such as when the system is being flushed with clean air. However, light trap 35 and the associated aperture 33 do not trap the light scattered by solid particles contained in sampled air that is introduced into the system through conduit 36 in the sampling head, as illustrated by the dotted lines, and passes through focal point "A."

More specifically, sampling head 29 includes an air inlet passage (not shown) and an air outlet passage 36 which are normal to the plane of the paper. Preferably, the inlet passage is axially aligned with the outlet passage and both passages are axially aligned with focal point "A" of sampling head 27. During operation there is a continuous flow of sampled air through the above-described flow path and light from light source 13 is focused at point "A" which is occupied by this continuously flowing sampled air. Each particle passing through focal point "A" will cause the light to be scattered in the form of a light pulse having a duration equal to that time required for the particle to pass through focal point "A." That part of the light which is scattered in the downward direction is collected by elliptical mirror 37 which forms a converging light beam that impinges upon the lower surface of dichroic mirror 39 which is mounted at a 45° angle. The characteristics of dichroic mirror 39 are such that it rejects and reflects light which has a wave length less than 400 millimicrons and transmits light which has a wave length greater than 400 millimicrons. A photodetector, such as photomultiplier tube 41, is mounted directly above dichroic mirror 39 and another photodetector, such as photomultiplier 43, is mounted directly to the left of mirror 39. Light which has a wave length less than 400 millimicrons, which is referred to as scattered light (S), is reflected to the left through filter 45 and onto the light sensitive surface of photomultiplier tube 43. Light which has a wave length greater than 400 millimicrons, which is referred to as fluorescent light (F), is transmitted upward through filter 47 and onto the surface of photomultiplier tube 41.

Light source 13 is used in combination wtih filter 21. As illustrated by curve $b_2$ of FIG. 2, filter 21 is selected to transmit or have an excitation region of light having a wave length range of from about 200 to about 400 millimicrons and strongly reject or absorb light having a wave length of from about 400 to about 600 millimicrons. However, it should be noted that filter 21 will also transmit light having a wave length greater than about 600 millimicrons as indicated by curve $b_2$ of FIG. 2. However, this light will be excluded from photomultiplier 41 by filter 47 and from photomultiplier 43 by filter 45. Filter 47 is selected to transmit light within the fluorescent light (F) wave length range of from about 400 to about 600 millimicrons as indicated by curve $c$ of FIG. 2. Filter 45, which receives scattered light (S), is selected to transmit light within the scattered light (S) wave length range of from about 300 to about 400 millimicrons as indicated by curve $a$ of FIG. 2.

From this it can be seen that the detection device of FIG. 1 provides a unique system for identifying fluorescent objects since that light in the fluorescent region is prevented from being introduced into the light path by means of filter 21 and therefore the fluorescent light which is received by dichroic miror 39 and photomultiplier 41 is essentially only that emanating from the particles which are passing through focal point "A" of sampling head 29 of detector device 10. Still further filtering is achieved by filter 47 which transmits only fluorescent light in the 400 to 600 millimicron range and by filter 45 which transmits only scattered light in the 300 to 400 millimicron range. Further filtering is achieved by dichroic mirror 39 which reflects scattered light below 400 millimicrons to filter 45 and transmits only light above 400 millimicrons, which includes fluorescent light in the 400 to 600 millimicron range, to filter 47. As a result, only scattered light (S) in the range of 300 to 400 millimicrons is received by photomultiplier 43 and only fluorescent light (F) in the range of 400 to 600 millimicrons is received by photomultiplier 41.

In FIG. 3 is illustrated the electronic circuitry employed for processing the signals in accordance with one of the embodiments of the present invention. In FIG. 3 the output of photomultiplier tube 47, which processes the fluorescent signal (F), is applied to the input of amplifier 49, the output of which is applied to both the input of counter 51 and to the input of clipping circuit 53. The output of photomultiplier 43, which processes the scattered light signal (S), is applied to the input of amplifier 55, the output of which is applied to both the input of counter 57 and to the input of clipping circuit 59. The outputs of each of clipping circuits 53 and 59 are applied to the respective inputs of gate 61 which may be of the "AND" type. The output of gate 61 is applied to the input of counter 63.

The operation of the circuit illustrated in FIG. 3 will now be described by reference to FIGS. 4A and 4B. FIG. 4A represents typical scattered light signals (S) which has been processed by photomultiplier tube 43 and amplifier 55 and are applied to the input of clipping circuit 59. FIG. 4B represents typical fluorescent light signals (F) that have been processed by photomultiplier 47 and amplifier 49 and are applied to the input of clipping circuit 53. Although the threshold values of clipping circuits 53 and 57 may be changed, depending upon the particular needs, the values which have been successful for application in accordance with the present invention are as illustrated in FIGS. 4A and 4B. In this example clipping circuit 59 has a threshold value of 0.4 volt and clipping circuit 53 has a threshold value of 0.2 volt. The basic purpose of the FIG. 3 circuit is to count only the fluorescent light (F) emanating from fluorescent particles and to not count fluorescent light emanating from large non-fluorescent particles which is referred to as "false fluorescent" light. It has been discovered that most particles will emanate scattered light, when passing through focal point "A" such that the scattered light signal from these particles will have a magnitude less than 0.4 volt. However, it has been found that relatively large particles of non-fluorescent material will produce fluorescent light, within the wave length range of 400 to 600 millimicrons, which produces a "false fluorescent" count. It is therefore necessary to eliminate this "false fluorescent" count which is achieved in the hereinafter described manner.

Assume first that a fluorescent particle is illuminated at point "A" that produces a fluorescent light pulse which, when processed by photomultiplier 47 and amplifier 49, provides an electrical pulse having a value greater than 0.2 volt and that no scatter signal is generated. When this condition occurs, as illustrated at time (1) of FIGS. 4A and 4B, there will be an output pulse from gate 61. This is because both clipping circuit 59 and clipping circuit 53 will provide output pulses. This may be achieved by many different electronic techniques, such as by the use of a clock 62 which provides an output pulse to each of clipping circuits 53 and 59 when either of the clipping circuits receives an input pulse. Clipping circuit 53 provides an output pulse only when there is an (F) signal greater than 0.2 volt. Clipping circuit 59 provides an output pulse at all clock times, except when there is an (S) signal that is greater than 0.4 volt. When the (S) signal is greater than 0.4 volt there is no output from clipping circuit 59. Referring now to the time (2) of FIGS. 4A and 4B it will be noted that there is an (F) signal less than 0.2 volt and there is no (S) signal. When this occurs there will be no output from clipping circuit 53 because the (F) signal is less than 0.2 volt. Clipping circuit 59 will produce an output signal under these conditions since the (S) signal is less than 0.4 volt. However, there will be no output signal from "AND" gate 61, since there is no pulse input from clipping circuit 53, and counter 63 will therefore produce no count. In the time (3) situation, where the (S) signal is greater than 0.4 volt and the (F) signal is greater than 0.2 volt there will be no output from gate 61 since the (F) signal is greater than 0.4 volt. Under this situation there will be an output signal from clipping 53 since the (F) signal is greater than 0.2 volt. However, there will be no output from gate 61, since there is no pulse input from clipping circuit 59, and therefore counter 63 will not register this event. This is particularly important since the signals obtained in the time (3) situation are due to large non-fluorescent particles which result in a "false fluorescent" (F) signal greater than 0.2 volt and an (S) signal greater than 0.4 volt. Therefore the "false fluorescent" signal is not counted. A similar situation is encountered in the time (4) situation in which the (S) signal is greater than 0.4 volt and the (F) signal is less than 0.2 volt which may be encountered in situations where the large non-fluorescent particle does not yield as much (F) signal as it did in the time (3) situation. In this time (4) situation there will be no output signal from either clipping circuit 53 or clipping circuit 59 since there will be no clock pulse and clipping circuit 53 is inhibited by the (F) signal being less than 0.2 volt and clipping circuit of 59 is inhibited by the (S) signal greater than 0.4 volt. In the time (5) situation the (S) signal is less than 0.4 volt and the (F) signal is greater than 0.2 volt. This is a true reading of a fluorescent particle and is not due to large non-fluorescent particles since the scattered signal (S) is less than 0.4 volt. In this situation there is an output from clipping circuit 53 and an output from clipping circuit 59 since neither of these clipping circuits is inhibited. In the time (6) situation the (S) signal is less than 0.4 volt and the (F) signal is less than 0.2 volt. In this situation there will be an output signal from clipping circuit 59 since the (S) signal is less than 0.4 volt but there will be no output from clipping circuit 53 since the (F) pulse is less than 0.2 volt. Therefore, there will be no output signal from gate 61 and there will be no count on counter 63. In the time (7) situation there is illustrated a strong (S) signal of greater than 0.4 volt and no (F) signal. In this situation there will be no counting in counter 63 because there is no output from clipping circuit 53. This is desired since counter 63 functions to count only the fluorescent signals from actual fluorosecent particles. In the time (8) situation, the (S) signal is less than 0.4 volt and there is no (F) signal. In this situation there will be an output from clipping circuit 59 since the (S) signal is less than 0.4 volt, however, there will be no output from clipping circuit 53 since there is no (F) signal. As a result gate 61 will produce no output and therefore counter 63 will not count.

In view of the foregoing it can be seen that there are only two situations in which there will be a pulse output from gate 61 which is then registered on counter 63 to indicate the number of fluorescent particles. One of these situations occurs when the (F) signal is greater than 0.2 volt and there is no (S) signal as in the time (1) example. The other situation occurs when the (F) signal is greater than 0.2 volt and the (S) signal has some value less than 0.4 volt as in the time (5) example. Both of these situations represent fluorescent signals produced by real fluorescent particles that are passing through focal point "A" of sampling head 29 of the detection device.

Counter 57 functions to maintain a continuous particle count of all particles passing through focal point "A." Because there is an inherent noise level in the optical and electronic systems it is not desirable to count signals below a lower threshold level of some predetermined voltage at the output of amplifier 55. Therefore, counter 57 preferably includes a clipping circuit providing threshold voltage. An equivalent lower threshold circuit could be used in clipping circuit 59 in those situations where counter 57 is connected to its output.

Counter 51 functions to maintain a continuous particle count of all fluorescent signals whether these signals are "false" or "true." This information is useful to obtain an indication of the number of large particles that exist in the sampled air. This is done by taking the difference between the counts registered on counter 57 and counter 63, that provides the total count of fluorescent particles in the sampled air.

Typically, there are about 10,000 particles in a liter of normal clean air that produce pulses greater than 0.05 volt. Therefore, in one liter of clean air, which is typically sampled every five seconds by the present invention, there will be a pulse frequency of about 2,000 pulses per second. Typical read-outs from counter 63 and from counters 51 and 57 take place every five seconds. In order to appreciate the effectiveness of this system, it should be recognized that there are about $10^{10}$ countable fluorescent particles that are obtained from aerosolization of one cubic centimeter of fluorescent liquid. One cubic mile of air has about $10^{12}$ liters and therefore 100 cubic centimeters of fluorescent liquid will produce a countable level of one fluorescent particle per liter of air. Since the equipment is capable of sampling about one liter of air each 5 seconds there will therefore be one countable fluorescent particle in this liter of air which will be registered on the output of counter 63 at each five second interval. Many actual tests have been made under these situations and there has been correlation between the fluorescent particle counting by the present invention and the counting of the fluorescent particles by means of microscopic examination.

Another illustration is the consideration that one liter of fluorescent liquid will provide ten countable fluorescent particles per liter of air in a cubic mile of air. The liquid cost is about $6.00 per cubic liter which makes it economically practical to seed large masses of air with fluorescent liquid. Prior equipment has dictated the expenditure of thousands of dollars for seeding air masses with fluorescent particles to achieve adequate tracing of the air flow path. With the present invention one crosswind mile has been aerosolized with four liters of fluorescent liquid at a cost of about $24, with the result of detecting fluorescent particles 100 to 1000 miles downward from the point of release.

In FIG. 5 is illustrated another embodiment of the present invention. It has been found that the electronic analogue of the eye's ability can be approximated by splitting the light from a given particle into two separate components. That is, the scattered light component (S) which is nominally proportional to the physical area of the particle, and a fluorescent component (F) which defines the fluorescent yield of the particle. By suitable amplifying each signal through separate logarithmic amplifiers and then processing these two signals through a differential amplifier, one obtains a signal corresponding to the $\log (F) - \log (S)$, or $\log (F/S)$. This signal is an electronic analogue of the eye's recognition of fluorescent brilliance per unit area. In this embodiment the (F) signal, which is processed by photomultiplier tube 47, is applied to the input of amplifier 49 the output of which is applied to the input of log amplifier 65. The output of log amplifier 65 is applied to the input of log difference circuit 67. The output of amplifier 49 is also applied to the input of counter 51. The (S) signal, which is processed by photomultiplier tube 43, is applied to the input of amplifier 55, the output of which is applied to both counter 57 and to the input of log amplifier 69. The output of log amplifier 69 is applied to the input of log difference circuit 67. Log difference circuit 67 is preferably a differential DC amplifier. The two signals that are fed into the log difference circuit provide a $\log (F) - \log (S)$ output signal. The output from log difference circuit 67 is a measure of the fluorescent brilliance per unit area of a particle passing through focal point "A" of FIG. 1, since $\log (F) - \log (S) = \log (F/S)$. This is because in virtually all situations the main component of the fluorescent signal is from the surface of the irradiated particle. The output of log difference circuit 67 is preferably applied to the input of pulse height amplifier 69. When this is done the input to the pulse height analyzer preferably includes a calibrated pulse height discriminator having a range of 0.01 to 5.0 volts. Because of noise it is generally undesirable to count differential log pulse height when less than a certain value, for example 0.02 volt. However, it generally is desirable to count these pulse heights when between, for example, 0.02 and 5.0 volts.

The FIG. 5 embodiment of the present invention has resulted in the reduction in "false fluorescent" counts by about two orders of magnitude as compared to previous electro-optical equipment. This electro-optical detector of FIG. 5 closely approximates the sensitive ability of the human eye, but with a recognition time measure in microseconds rather than in seconds.

To achieve high sampling rates in the embodiments of the present invention, a nearly instantaneous fluorescent response is required because the particle resident time at a focal point of the electro-optical system is very small and is of the order of 100 microseconds. Since the phosphorescent decay time for zinc cadmium sulfide is of the order of $10^{-3}$ seconds, a considerable reduction in the peak fluorescent signal results at high sampling rates or short focal residence times. Due to the high quantum yield of zinc cadmium sulfide, however, a sampling rate of 12 liters per minute with a focal residence time of 100 microseconds is adequate for detection of particles down to one micron in diameter. Sampling at sonic velocity through focal point "A" of FIG. 1, however, results in a marked reduction (by a factor of about 10) in sensitivity with zinc cadmium sulfide. Consequently, fluorescent materials with a nearly instantaneous emission are desired for maximum sensitivity at high sampling rates. Selected fluorescent brighteners produced under the trade name Calcofluor were found to be excellent in quantum yield, solubility, low toxicity, cost and availability in both liquid and dispersible powder forms.

What is claimed is:

1. A particle detecting device comprising:
(a) a light source;
(b) means for focusing light from said light source at a focal point;
(c) means for introducing a sampled medium into said focal point;
(d) means for collecting and generating a light beam from light emanating from particles that may be contained in said medium;
(e) a dichroic mirror is disposed in the path of said light beam for reflecting light having wave lengths below a predetermined value and for transmitting light having wave lengths greater than said predetermined value;
(f) a first filter is disposed in the path of said light reflected by said dichroic mirror wherein said first filter transmits light having a predetermined range of wave lengths below said predetermined value; and
(g) a second filter is disposed in the path of said light passing through said dichroic mirror wherein said second filter transmits light having a predetermined range of wave lengths above said predetermined value.

2. The device of claim 1 wherein:
(a) said dichroic mirror reflects light having wave lengths less than 400 millimicrons;
(b) said first filter transmits light having wave lengths from about 300 millimicrons to about 400 millimicrons; and
(c) said second filter transmits light having wave lengths from about 400 millimicrons to about 600 millimicrons.

3. The device of claim 1 including:
(a) means for counting the light pulses emanating from particles having wave lengths greater than said predetermined value; and
(b) means for preventing said last mentioned means from counting pulses from said last mentioned particles when said particles exceed a predetermined size.

4. The device of claim 3 wherein:

(a) means for detecting the magnitude of light that emanates from said last mentioned particles having wave lengths less than said predetermined value; and
(b) said threshold means preventing said last mentioned means from counting particles when the light below said predetermined wave lengths is such a predetermined value.

5. The device of claim 1 wherein:
(a) a first photodetector receives light transmitted through said first filter;
(b) a second photoselectric receives light transmitted through said second filter;
(c) first clipping means receiving signals from said first photodetector;
(d) second clipping means receiving signals from said second photodetector;
(e) the outputs of said first and second clipping means connected to the input of an AND gate; and
(f) a counter connected to the output of said AND gate.

6. The device of claim 1 wherein:
(a) a first photodetector receives light transmitted through said first filter;
(b) a second photodetector receives light transmitted through said second filter;
(c) a first logarithmic amplifier receives signals from said first photodetector;
(d) a second logarithmic amplifier receives signals from said second photodetector; and
(e) the outputs of said first and second logarithmic amplifiers connected to the input of a logarithmic difference circuit.

References Cited
UNITED STATES PATENTS

| | | | |
|---|---|---|---|
| 2,817,265 | 12/1957 | Covely | 250—206 |
| 3,315,229 | 4/1967 | Smithline | 340—146.3 |
| 3,457,407 | 7/1969 | Goldberg | 250—71 |

DARYL W. COOK, Primary Examiner

J. M. THESZ, Assistant Examiner

U.S. Cl. X.R.

356—103